United States Patent [19]

Sekella

[11] Patent Number: 4,982,825
[45] Date of Patent: Jan. 8, 1991

[54] TORQUE AND AIR GAP ADJUSTMENT MECHANISM FOR SPRING ENGAGED BRAKE OR CLUTCH

[75] Inventor: T. Curran Sekella, Elmira, N.Y.

[73] Assignee: Sepal, Elmira, N.Y.

[21] Appl. No.: 350,506

[22] Filed: May 11, 1989

[51] Int. Cl.$^5$ .................. F16D 13/75; F16D 27/04; F16D 65/42

[52] U.S. Cl. .................. 192/90; 188/161; 188/196 R; 192/111 B

[58] Field of Search .................. 192/84 B, 90, 111 B, 192/84 C; 188/161, 163, 196 R, 196 V

[56] References Cited

U.S. PATENT DOCUMENTS

| | | | |
|---|---|---|---|
| 2,209,776 | 7/1940 | Kiekhaefer | 192/84 B |
| 2,225,563 | 3/1940 | Lambert | 188/72 |
| 2,701,036 | 10/1953 | 3Osborne | 188/171 |
| 2,983,339 | 5/1961 | Neff | 188/171 |
| 3,357,528 | 12/1967 | Verlinde | 188/171 |
| 3,410,380 | 11/1968 | Kooistra | 192/111 B |
| 3,554,335 | 1/1971 | Ritter et al. | 188/161 |
| 3,608,679 | 9/1971 | Harrison | 188/171 |
| 3,613,849 | 10/1971 | Pape | 192/84 B |
| 4,142,610 | 3/1979 | Alexander et al. | 192/90 |

FOREIGN PATENT DOCUMENTS

| | | | |
|---|---|---|---|
| 285012 | 10/1988 | European Pat. Off. | 188/161 |
| 61-211539 | 9/1986 | Japan | 188/163 |
| 62-20923 | 1/1987 | Japan | 188/163 |
| 1344500 | 1/1974 | United Kingdom | 192/84 C |

*Primary Examiner*—Rodney H. Bonck
*Attorney, Agent, or Firm*—Benasutti

[57] ABSTRACT

A torque and air gap adjustment mechanism is provided for a spring engaged electromagnetic brake or clutch, and consists of a plurality of hubs threaded to one another and to the brake casing for axial movement with respect thereto and with respect to each other. A plurality of detents are disposed within the hub positioned in cylindrical holes with springs forcing them away from each other and out of the holes. These detents are retained in the holes at one end by a hub provided for the torque adjustment and at the other end by the brake plate. In both the hub and the brake plate there are indentations to retain the detents. These indentations have differing angles as do the engaging surfaces of the detents to permit torque adjustment independent of air gap adjustment upon rotation of the torque adjusting hub.

14 Claims, 3 Drawing Sheets

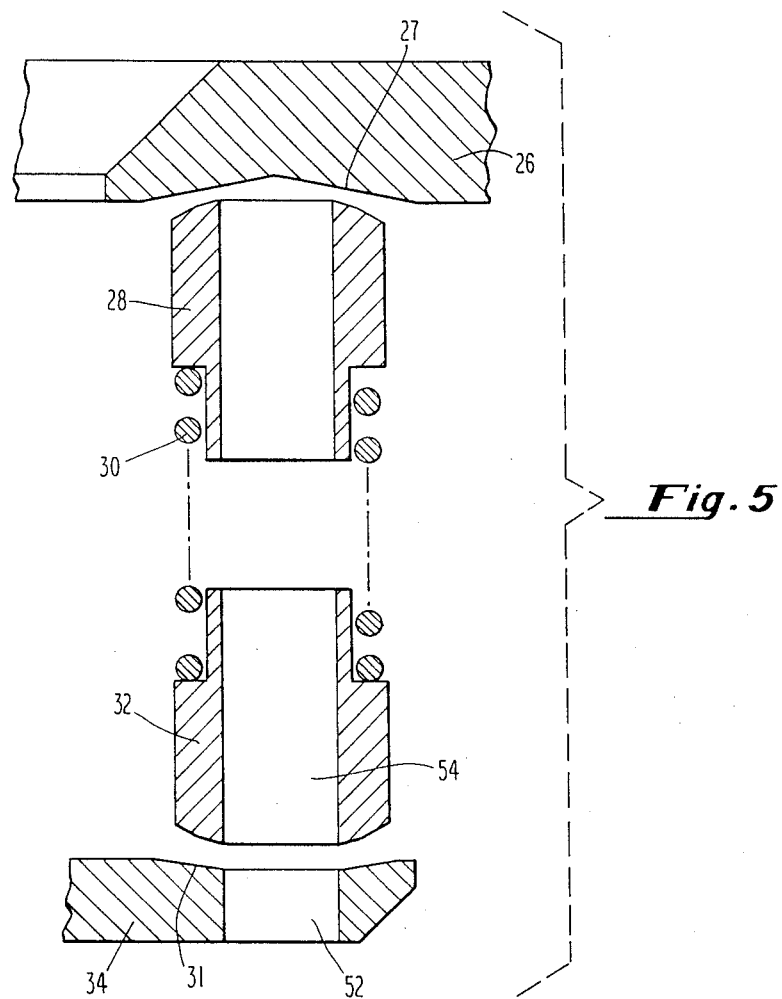

4,982,825

TORQUE AND AIR GAP ADJUSTMENT MECHANISM FOR SPRING ENGAGED BRAKE OR CLUTCH

BACKGROUND OF THE INVENTION (1.) Field of the Invention

This invention relates to electromagnetic clutches or brakes, and more particularly, spring-biased brakes.

(2.) Description of the Prior Art

In the prior art, spring engaged clutches and brakes were used in applications where it was desirable that the clutch or brake be engaged or coupled when there was an absence of electrical power. This is frequently referred to as a "fail-safe" design. A "fail-safe" clutch could be used, for example, in a cooling fan application where it is desirable to turn the fan on and off to control the temperature of a device, but in the event of a loss of control, it would be safer for the fan to be on continuously and over-cool. "Fail-safe" brakes are more common in their application to moving devices (elevators, fork trucks, computer disc drives, etc.) which are safer stopped than moving.

These brakes are constructed with one or more plates engaging one or more sets of brake shoes on a friction disc in the spring-biased position. There is a gap between the electromagnetic force portion and the plates. Due to the wear of the friction material on the brake pads, this gap increases with use. Accordingly, two frequently called for adjustments are adjustment of the spring force, which in turn assists braking torque, and adjustment of the air gap. The air gap adjustment is necessary when the gaps becomes so large that the plate will not disengage from the brake shoe due to insufficient magnetic force. At that point, either the friction disc of the brake must be replaced or the air gap adjusted.

Further in the prior art, it was known to make these adjustments independent of one another and at a plurality of locations as through the number of screws or adjustable springs.

It is desirable from a maintenance standpoint to provide a single point of adjustment and to combine these functions of adjustment of air gap and torque in a single integrated assembly.

It is further desirable that this assemblage provide for uniform application of force against the plate.

Accordingly, it is an object of this invention to provide a single assembly integrated adjustment device for air gap and braking torque.

It is a further object of this invention to provide such a device in which there is an independent control for the uniform application of force in the adjustment of torque uniformly about the plate and independently of the air gap adjustment mechanism which can operate coextensively with that mechanism.

It is a further object of this invention to reduce the number of moving parts necessary to accomplish this end.

These and other objects of this invention will become apparent from the following description with reference to the accompanying drawings.

SUMMARY OF THE INVENTION

In this invention, both the spring and air gap adjustments are integrated together to minimize space and duplication of parts and yet provide independent adjustments. As in all spring engaged clutches and brakes, spring force reduces as the air gap increases due to friction material wear. However, in accordance with this invention, since the adjustments are integrated, the spring force returns to its original level when the air gap is readjusted.

BRIEF DESCRIPTION OF THE DRAWINGS

FIG. 5 is a greatly enlarged and slightly exploded sectional view of a portion of the apparatus shown in FIGS. 1 and 2.

DETAILED DESCRIPTION OF THE PREFERRED EMBODIMENT

In the following specification, certain specific language will be utilized and a specific embodiment described in accordance with the requirements of 35 U.S.C. §112, but it is to be understood that the same is not intended to be limiting and should not be so construed in as much as the invention is capable of taking many forms and variations within the scope of the appended claims.

Further, in the following detailed description, the coupling arrangement will be described in connection with an improved electromagnetic brake, but it is to be understood that this could also apply to a clutch.

Figure 1:
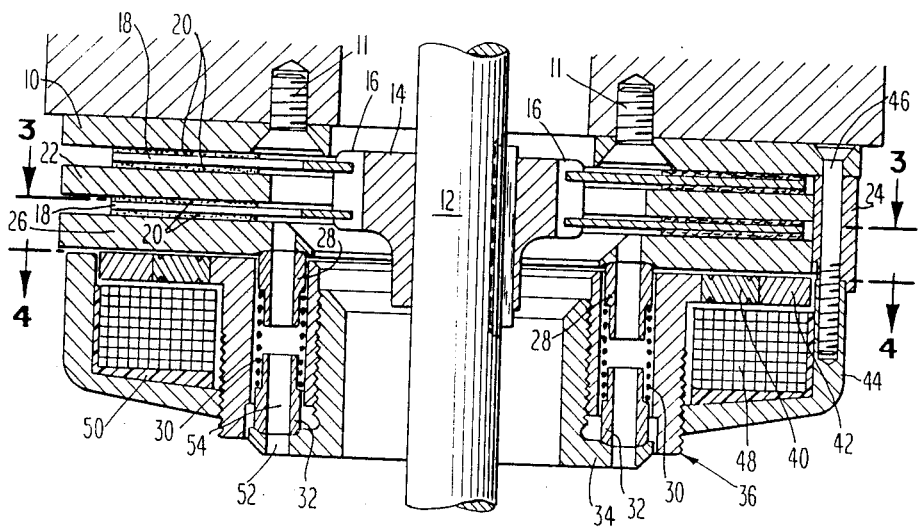
FIG. 1 is a cross-section of a brake device in accordance with a preferred embodiment of this invention shown in the de-energized or braking position.
Figure 3:
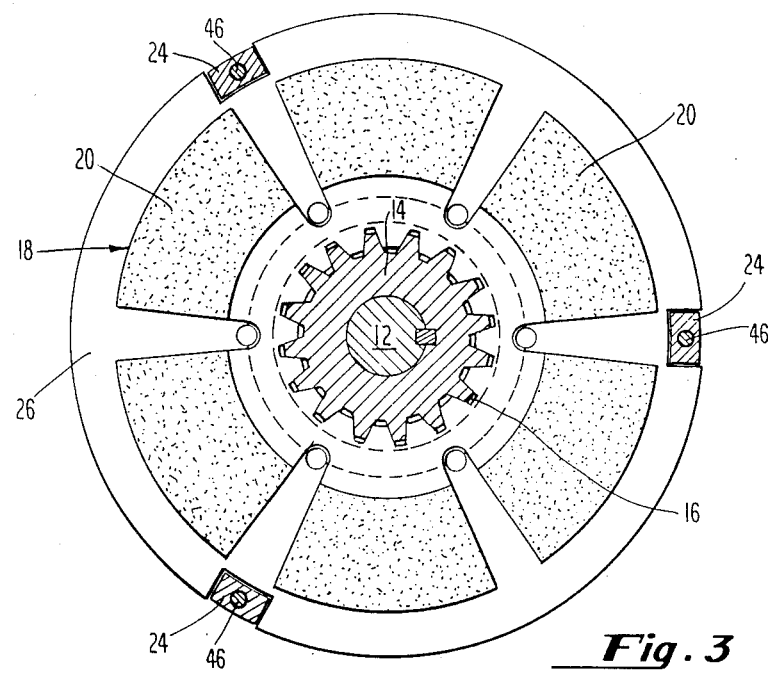
FIG. 3 is a sectional plan view taken as indicated by lines and arrows 3—3 in FIG. 1.

Referring to the drawings, the principal elements of a spring engaged brake and their position when engaged, i.e., de-energized, are shown in cross-section. The brake comprises a back plate 10 which is fixedly mounted by the screws 11 about the shaft 12. Mounted directly on the shaft is a drive hub 14 which is keyed for rotation with the shaft 12 and which is circumscribed with splines 16. A plurality of drive discs and friction pad assemblies 18 are provided engaging the splines of the hub as shown in FIGS. 1 and 3; wherein it will be noted that the friction pads 20 are spaced about the face of the drive disc.

Located intermediate the drive disc and friction pad assemblies is a stationary plate 22 which is washer-like in shape and has a central hole of large enough diameter to clear the splines of the hub 14. This plate is movable axially, but is retained against rotative movement and radial movement by three equally spaced slots in its outer periphery which are engaged by spacers 24 fixed to the back plate 10.

Proximate to the face of the drive disc and friction pad assembly 18 most remote from the back plate 10 is a second washer-like part, an armature plate 26. This also has three equally spaced slots in its periphery engaging the spacers 24, and a hole in the center adequate to avoid contact with the splines 16. This part can move axially, but not radially and is retained from rotary motion as was the case with the part number 22.

The armature plate 26 is acted upon by a plurality of detents 28 engaged in a plurality of indents 27 in the plate 26, which normally force it into engagement with the friction pads 20 under the urging of springs 30. The springs are contained on shouldered portions of the detents 28 and 32. These latter detents 32 are retained within chamfered indents 31 on the adjoining face of the torque adjustment hub 34. The hub 34 is threaded as indicated to a magnetic body and adjuster assembly comprising an air gap adjuster assembly and a magnetic body subassembly.

The air gap adjuster assembly designated generally 36 comprises an inner pole hub 38 preferably made of magnetic flux carrying material, a pole separator ring 40 preferably made of nonmagnetic material, and an outer pole ring 42 also made of magnetic flux carrying material; which are assembled as shown. The ring 40 is staked about its circumference in order to retain the parts in the L-shaped configuration shown in section.

The magnetic body and adjuster assembly comprises a magnetic body 44 which is fixedly attached to the back plate 10 by means of a plurality of screws 46 holding it firmly against the spacers 24. Within this magnetic body, which is also made of magnetic flux carrying material, there is positioned a coil 48. Epoxy 50 or similar material is poured all around the coil within the body to form the subassembly and to retain the coil.

Figure 4:
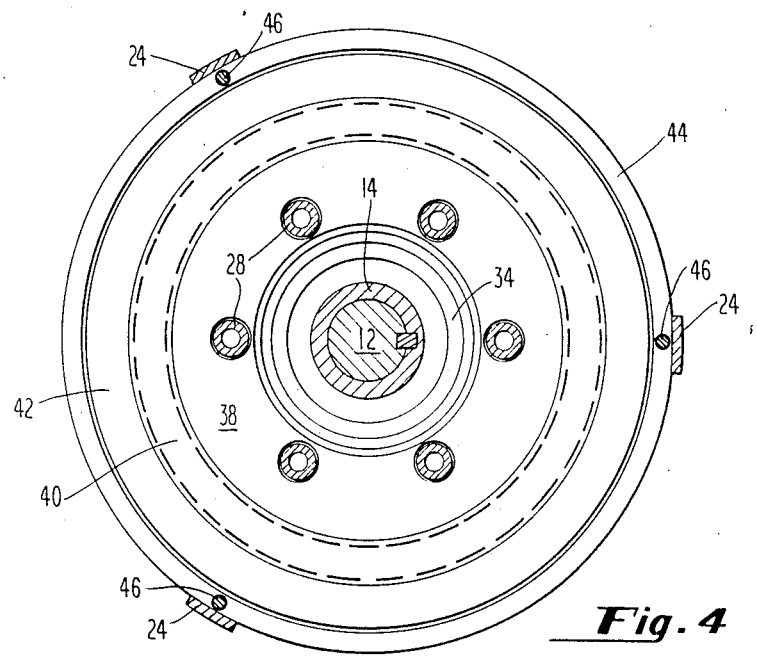
FIG. 4 is a sectional plan view taken as indicated by lines and arrows 4—4 in FIG. 1.

As shown in FIG. 4, the detents 28 are six in number and are equally spaced to provide a uniform pressure against the armature plate 26, as shown in FIG. 1. This pressure is applied to indentations 27 (FIG. 2) which are equally spaced on that plate. Referring to FIG. 5, note that the detents have multiple angles. This figure has been exaggerated and exploded in order to show that there is a steeper angle in section to form the indentation 27 than there angle in section forming the indentations 31 in hub 34. Thus the depth of penetration of the detent 28 into the indentation 27 in plate 26, is greater than the penetration of the detent 32 into the indentations 31 in the surface of the torque adjustment hub 34 as clearly illustrated in the figure. For example, the included angle of indentations 27 may desirably be 157 to 159 degrees, whereas the included angle of the indentations 31 may be 173 to 175 degrees. The desired difference in penetration and ultimately force of disengagement upon rotation of the hub 34 or adjuster 36 can be achieved with detents with mating angles. However, by providing multiple angles on the surface of the detents 28 and 32, as for example, 2.5 to 3.5 degrees at the tip and 11.5 to 12.5 degrees further back on the shank of the detent they can be interchangeable (or the same) parts. The functions of these parts will be described in connection with the operation of the adjustment mechanism.

OPERATION

In operation, the device is a fail-safe device in which, with the current off, there is no magnetic field; and the springs 30 act to force the detents 28 into the indented portions 27 of the plate 26 and to force that plate against the pads 20. This, in turn, forces the members 18 against the member 22 and the member 10 and acts as a braking device. When current is applied through the coil 48, a magnetic flux travels through the easiest path, namely, the magnetic body 44 and the air gap adjustment assembly 36 going through the inner pole hub 38 and then the armature plate 26 and through the outer pole ring 42 and the magnetic body 44 to complete the circuit. This draws the armature plate 26 from the position shown in FIG. 1 to the position shown in FIG. 2 and is known as the nonbraking, energized position. In this position, the armature plate does not contact the drive disc and friction pad assemblies, and they may become minimally separated from the stationary plate 22 and back plate 10. The combined spaces between the armature plate, drive disc and friction pad assemblies, stationary plate and back plate represent the total air gap. As the friction pads 20 begin to wear, this gap increases, and it may become so large that the magnetic flux will be unable to draw the armature plate 26 from the position shown in FIG. 1 to that shown in FIG. 2. Thus, it is desirable to adjust this air gap as a maintenance function. To do this, the air gap adjuster assembly 36 may be rotated about the shaft so that it moves axially toward the armature plate 26 thereby narrowing the air gap.

If adjustment is required in the braking torque, this may be accomplished by rotating the torque adjustment hub 34 about the shaft clockwise or counter clockwise to either increase or decrease respectively the force of the springs 30.

The angles of the detents and indentations aid in this process in the following manner. Since there is a steeper angle in the indentations 27 in the armature plate 26 then there is in the indentations 31 in the face of the torque adjusting hub 34 and, therefore, the depth of the indentations 27 is greater in the plate 26 then the depth of the indentations 31 in the hub 34, when the hub 34 is rotated, the detents 32 ride out of the indentations in the face of the hub 34, while the detents 28 remain in the indentations 27 in the member 26. Thus, turning the member 34 clockwise will drive the detents 32 toward the detents 28 and put greater pressure on the springs 30; all the while maintaining contact between the detents 28 and the indentations 27 in the member 26. This may be accomplished by inserting a pin in the hole 52 to such a depth that it does not completely penetrate the member 34 and then applying a moment force rotationally about the axis of the shaft 12.

Figure 2:
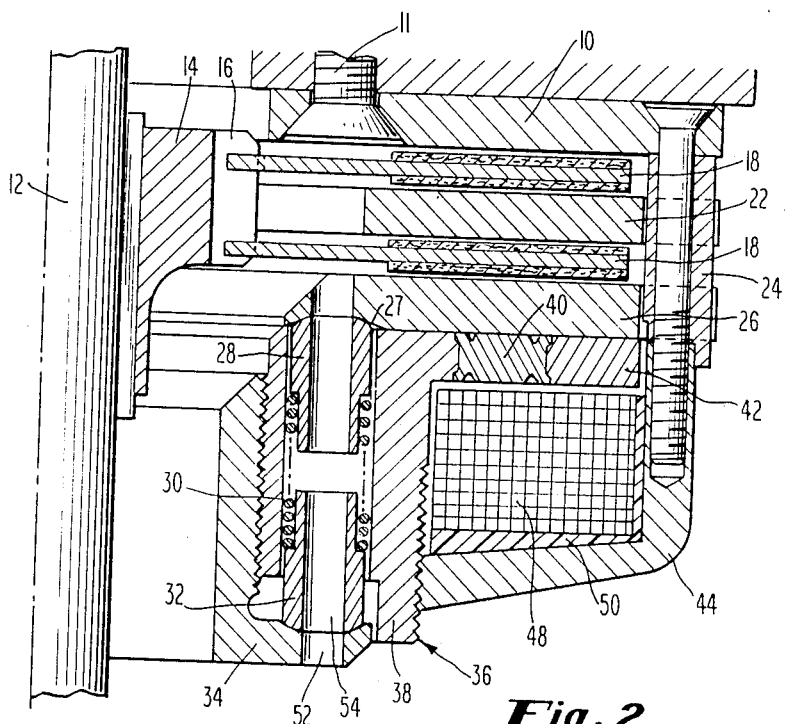
FIG. 2 is an enlarged cross-section of the right side of the device shown in FIG. 1 with the brake in the non-braking, energized position.

If it is desired to adjust the air gap, the pin may be inserted further into the hole 52 so that it goes into the hole 54 in the detent 32. Since the detent 32 is retained within a cylindrical hole in the inner pole hub 38, applying a similar force on the pin while it is in the hole 54 will drive the hub in the clockwise direction and thus drive the air gap adjuster assembly 36 toward the armature plate 26; since the adjuster 36 is in threaded engagement with the magnetic body 44, as illustrated in FIGS. 1 and 2.

Thus by rotating the torque adjustment hub 34, there is a uniform adjustment of the spring force against the armature plate 26. By rotating the air gap adjuster assembly 36 which is threaded to the magnetic body, the air gap is adjusted uniformly. Both of these adjustments can be made at one point of application of force, rather than at multiple points.

To prevent the mechanism from changing position due to vibration or mild shock, the multiple detent mechanism is used. Both spring and air gap adjustments are integrated together to minimize space and duplication of parts, while at the same providing independent adjustments. As in all spring engaged brakes or clutches, the spring force reduces as the air gap increases due to friction material wear. However, since the adjustments are integrated, the spring force returns to its original level when the air gap is readjusted to its original setting.

With this preferred embodiment, several additional features are provided with respect to mounting. In particular, by building the mounting screws into the brake and providing access holes to reach these screws with a suitable tool, disassembly is not required for mounting and dismounting. This is accomplished by making the detents hollow and locating them in line with the mounting screws 11. Clearance holes are provided as shown by comparing FIGS. 1 and 2 with FIGS. 3 and 4.

FIG. 3 shows slots 19 in the drive disc and friction pad assemblies 18. These serve to pump air over the three stationary parts (10, 22, 26) in order to cool them between braking cycles. Also, they allow cool access to the mounting screws as shown in the left hand section of FIG. 1. The holes on the hub 34, armature 26 and stationary plate 22 allow air to flow towards these slots.

It will be understood that various changes in the details, materials and arrangement of the parts which have been described and illustrated in order to explain the nature of this invention, may be made by those skilled in the art without departing from the principle and scope of the invention as expressed in the following claims.

What is claimed is:

1. In a spring engaged electromagnetically operated brake or clutch of the type having an air gap between friction pads associated with a rotating shaft and fixed plates mounted around the shaft, the improvement comprising an integrated assembly containing means for independent adjustment of the air gap and means for independent adjustment of brake torque, such that adjustment of the air gap does not alter brake torque, said integrated assembly comprising:
   (a) an assembly housing fixedly situated about the shaft;
   (b) an air gap adjustment assembly situated about the shaft, and threadedly engaged with said assembly housing;
   (c) a threaded torque adjustment hub situated about the shaft, but within the air gap adjustment assembly and threadedly engaged with the air gap adjustment assembly;
   (d) means for independently rotating the torque adjustment hub with respect to the air gap adjustment assembly without rotating the air gap adjustment assembly; and,
   (e) means for rotating the air gap adjustment assembly and the torque adjustment hub as a single unit with respect to the assembly housing.

2. The invention of claim 1 wherein the means for independently rotating the torque adjustment hub comprises said hub having a plurality of holes adapted to receive a pin for applying a rotational moment to the torque adjustment hub, and the means for rotating the air gap adjustment assembly and the torque adjustment hub as a single unit comprises said air gap adjustment assembly having a plurality of bores adapted to align with the holes in the torque adjustment hub to receive the pin inserted through one of said holes into one of said bores.

3. A spring engaged electromagnetically operated brake for braking a rotating shaft, comprising:
   (a) a back plate fixedly mounted about the rotating shaft;
   (b) one or more friction pad assemblies concentrically attached to said shaft for rotation therewith;
   (c) one or more plates mounted concentrically around but not attached to said shaft, said plates being capable of axial movement along the shaft relative to the back plate, but fixed against radial or rotative movement relative to the back plate, and wherein the plate most remote from the back plate is an armature plate containing magnetic flux carrying material;
   (d) each of said plates being aligned proximate to an associated friction pad assembly and spaced from said associated friction pad assembly when the brake is electromagnetically energized, wherein the combined space between the associated plates and friction pad assemblies defines an air gap;
   (e) an electromagnet for holding the armature plate away from its associated friction pad assembly when the electromagnet is energized;
   (f) spring means biased to press the plates against the associated friction pad assemblies when the electromagnet is deenergized, said spring means comprising:
      (i) a torque adjustment hub situated about the shaft;
      (ii) a plurality of armature detents adapted for contact against the armature plate;
      (iii) a hub detent associated with each armature detent, said hub detents being adapted for contact against the torque adjustment hub; and,
      (iv) a spring disposed between each of said armature detents and its associated hub detent, said spring being biased to urge the armature plate toward the back plate.
   (g) means for independently adjusting the spring bias; and,
   (h) means for adjusting the air gap, which is integrated with the means for adjusting the spring bias such that adjustment to the air gap does not alter the spring bias.

4. The braking mechanism of claim 3, wherein the means for independently adjusting the spring bias comprises:
   an assembly housing fixedly attached to the back plate and situated about the shaft;
   the torque adjustment hub being threaded for engagement with threads associated with the housing, such that rotation of the hub causes the hub to move axially with respect to the armature plate; and
   means to turn the torque adjustment hub about the shaft, resulting in axial movement of the torque adjustment hub with respect to the armature plate, thus changing the spring tension by changing the distance between the armature detents and the associated hub detents.

5. The braking mechanism of claim 4, wherein the means to turn the torque adjustment hub about the shaft comprises the torque adjustment hub having a plurality of holes to allow the insertion of a pin adapted to be used to turn the torque adjustment hub.

6. The braking mechanism of claim 5, wherein said means for adjusting the air gap comprises:
   an air gap adjustment assembly, situated about the torque adjustment hub and the shaft;
   said air gap adjustment assembly including a threaded inner pole hub adapted for engagement with threads disposed on the housing and with the threads of the torque adjustment hub;
   means for the inner pole hub to retain the detents such that a pin can be inserted through one of the holes in the torque adjustment hub and engage at least one detent, whereby a rotational moment can be applied to simultaneously turn the air gap adjustment assembly and the torque adjustment hub, resulting in the simultaneous axial movement of the air gap adjustment assembly and the torque adjustment hub, changing the size of the air gap without altering spring bias.

7. The braking mechanism of claim 6, wherein each of the hub detents has an axial bore adapted to receive a pin which has been inserted completely through one of the holes in the torque adjustment hub.

8. The braking mechanism of claim 7, wherein said spring means further comprises:
   the armature detents having beveled surfaces at the point where each armature detent contacts the armature plate;
   the hub detents having beveled surfaces at the point where each hub detent contacts the torque adjustment hub;
   a plurality of chamfered indents on the torque adjustment hub; and,
   a plurality of chamfered indents on the armature plate, which have a steeper angle in section than the indents on the torque adjustment hub, so that a greater force is required to disengage the armature detents from the armature than is required to disengage the hub detents from the torque adjustment hub.

9. A spring engaged electromagnetically operated clutch for engaging a load with a rotating shaft, comprising:
   (a) a back plate situated about the shaft and capable of rotative movement with the shaft but not radial or axial movement with respect to the shaft;
   (b) one or more drive discs concentrically attached to said shaft for rotation therewith;
   (c) one or more plates mounted concentrically around but not attached to said shaft, said plates being capable of axial movement along the shaft relative to the back plate, but fixed against radial or rotative movement relative to the back plate, and wherein the plate most remote from said back plate is an armature plate containing magnetic flux carrying material;
   (d) each of said plates being aligned proximate to an associated drive disc and spaced from said associated disc when the clutch is electromagnetically energized, wherein the combined space between the associated plates and drive discs defines an air gap;
   (e) an electromagnet for moving the armature plate away from its associated drive disc when the electromagnet is energized;
   (f) spring means biased to press the plates against their associated drive discs when the electromagnet is deenergized, said spring means comprising;
      (i) a torque adjustment hub situated about the shaft;
      (ii) a plurality of armature detents adapted for contact against the armature plate;
      (iii) a hub detent associated with each armature detent, said hub detents being adapted for contact against the torque adjustment hub; and,
      (iv) a spring disposed between each of said armature detent and its associated hub detent, said spring being biased to urge the armature plate toward the back plate.
   (g) means for independently adjusting the spring bias; and
   (h) means for adjusting the air gap, which is integrated with the means for adjusting the spring bias such that adjustment to the air gap does not alter the spring bias.

10. The clutch mechanism of claim 9, wherein the means for independently adjusting the spring bias comprises:
    an assembly housing fixedly attached to the back plate and situated about the shaft;
    the torque adjustment hub being threaded for engagement with threads associated with the housing such that rotation of the hub causes the hub to move axially with respect to the armature plate; and
    means to turn the torque adjustment hub about the shaft, resulting in axial movement of the torque adjustment hub with respect to the armature plate, thus changing the spring tension by changing the distance between the armature detents and the associated hub detents.

11. The clutch mechanism of claim 10, wherein the means to turn the torque adjustment hub about the shaft comprises the torque adjustment hub having a plurality of holes to allow the insertion of a pin adapted to be used to turn the torque adjustment hub, so that a rotational moment can be applied.

12. The clutch mechanism of claim 11, wherein said means for adjusting the air gap comprises:
    an air gap adjustment assembly, situated about the torque adjustment hub and the shaft;
    said air gap adjustment assembly including a threaded inner pole hub adapted for engagement with threads disposed on the housing and with the threads of the torque adjustment hub;
    means for the inner pole hub to retain the detents such that a pin can be inserted through one of the holes in the torque adjustment hub and engage at least one detent, whereby a rotational moment can be applied to simultaneously turn the air gap adjustment assembly and the torque adjustment hub, resulting in the simultaneous axial movement of the air gap adjustment assembly and the torque adjustment hub, changing the size of the air gap without altering spring bias.

13. The clutch mechanism of claim 12, wherein each of the hub detents has an axial bore adapted to receive a pin which has been inserted completely through one of the holes in the torque adjustment hub.

14. The clutch mechanism of claim 13, wherein said spring means further comprises:
    the armature detents having beveled surfaces at the point where each armature detent contacts the armature plate;
    the hub detents having beveled surfaces at the point where each hub detent contacts the torque adjustment hub;
    a plurality of chamfered indents on the torque adjustment hub; and,
    a plurality of chamfered indents on the armature plate, which have a steeper angle in section than the indents on the torque adjustment hub, so that a greater force is required to disengage the armature detents from the armature than is required to disengage the hub detents from the torque adjustment hub.

* * * * *